United States Patent
Chen et al.

(10) Patent No.: US 10,158,839 B2
(45) Date of Patent: Dec. 18, 2018

(54) NON-TRANSITORY STORAGE MEDIUM AND APPARATUS FOR PROCESSING SOURCE IMAGE TO GENERATE TARGET IMAGE

(71) Applicant: Novatek Microelectronics Corp., Hsinchu (TW)

(72) Inventors: Chieh-Cheng Chen, Changhua County (TW); Chih-Chia Kuo, Hsinchu County (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 16/005,711

(22) Filed: Jun. 12, 2018

(65) Prior Publication Data

US 2018/0295339 A1 Oct. 11, 2018

Related U.S. Application Data

(63) Continuation of application No. 15/191,514, filed on Jun. 23, 2016, now Pat. No. 10,021,363.

(60) Provisional application No. 62/242,318, filed on Oct. 16, 2015.

(51) Int. Cl.
*H04N 13/00* (2018.01)
*H04N 5/45* (2011.01)
*H04N 13/122* (2018.01)
*H04N 13/156* (2018.01)
*G06T 1/20* (2006.01)
*H04N 13/106* (2018.01)

(52) U.S. Cl.
CPC ............. *H04N 13/122* (2018.05); *G06T 1/20* (2013.01); *H04N 5/45* (2013.01); *H04N 13/156* (2018.05); *H04N 13/106* (2018.05)

(58) Field of Classification Search
CPC .. H04N 13/0018; H04N 13/004; H04N 13/04; H04N 13/0007; H04N 13/122; H04N 13/156; H04N 13/106; H04N 5/45; H04N 5/265; H04N 13/00; G06T 1/20
USPC ......... 348/43, 465, 467, 584, 586, 588, 598; 382/173; 345/629, 630
See application file for complete search history.

(56) References Cited

U.S. PATENT DOCUMENTS

2014/0071234 A1* 3/2014 Millett .................... G01S 17/89
348/43

* cited by examiner

*Primary Examiner* — Sherrie Hsia
(74) *Attorney, Agent, or Firm* — JCIPRNET

(57) ABSTRACT

An apparatus including a processor and a non-transitory storage medium is provided. The non-transitory storage medium includes a program code executable by the processor. The apparatus is configured to execute the program code with the processor for processing a source image to generate a target image. The target image includes a plurality of target pictures, and the program code includes: a first code segment, configured to separate the source image into a first image comprising a first part of the source image and a second image comprising a second part of the source image; a second code segment, configured to process the first image to obtain a plurality of target first pictures according to a first setting; a third code segment, configured to process the second image to obtain a plurality of target second pictures according to a second setting; and a fourth code segment, configured to combine each of the target first pictures with a corresponding one of the target second pictures to obtain the plurality of target pictures.

24 Claims, 7 Drawing Sheets

നോൺ-TRANSITORY STORAGE MEDIUM AND APPARATUS FOR PROCESSING SOURCE IMAGE TO GENERATE TARGET IMAGE

CROSS-REFERENCE TO RELATED APPLICATION

This application is a continuation application of and claims the priority benefit of a prior application Ser. No. 15/191,514, filed on Jun. 23, 2016, now allowed. The prior application Ser. No. 15/191,514 claims the priority benefit of U.S. provisional application Ser. No. 62/242,318, filed on Oct. 16, 2015. The entirety of each of the above-mentioned patent applications is hereby incorporated by reference herein and made a part of this specification.

BACKGROUND OF THE INVENTION

1. Field of the Invention

The invention generally relates to a method and an apparatus for processing images, in particular, to a method and an apparatus for processing a source image to generate a target image.

2. Description of Related Art

Along with development of modern video technology, display apparatuses such as flat screen displays or curved displays are widely used, and are widely applied in various domains. A core element of these display apparatuses is an image processing device, which is used for processing source images received by these display apparatuses and providing desirable visual effects.

For example, in stereoscopic display technology, in order to complete parallax scrolling effect, many additional special circuits are necessary in the image processing device. For a television system on chip (TV SoC), to realize image processes of three dimensional visual effects, each image received by the TV SoC is usually separated for image processing. If the TV SoC supports pipeline (PIP) function, two video paths may exist in the TV SoC to process the separated images, and then the separated images are merged in a post circuit and to be displayed in a display apparatus. In related arts, parameter setting for the separated images is the same and not adjustable. In addition, the circuit structure of the conventional TV SoC for providing satisfactory visual effects is usually complex for realizing the special process, and the cost is expensive.

Therefore, how to design an image processing device having the aforementioned function and low cost and capable of providing satisfactory visual effects is an important issue for those technicians of the field.

SUMMARY OF THE INVENTION

Accordingly, the invention is directed to a non-transitory storage medium and an apparatus for processing a source image to generate a target image, capable of providing satisfactory visual effects.

The invention provides a non-transitory storage medium including a program code executable for a processor for processing a source image to generate a target image. The target image includes a plurality of target pictures. The program code includes: a first code segment, configured to separate the source image into a first image including a first part of the source image and a second image including a second part of the source image; a second code segment, configured to process the first image to obtain a plurality of target first pictures according to a first setting; a third code segment, configured to process the second image to obtain a plurality of target second pictures according to a second setting; and a fourth code segment, configured to combine each of the target first pictures with a corresponding one of the target second pictures to obtain the plurality of target pictures.

In an exemplary embodiment of the invention, the second setting is different from the first setting.

In an exemplary embodiment of the invention, the first setting includes at least one parameter. The second code segment is further configured to: dynamically adjust the at least one parameter of the first setting for each of the target first pictures; and process each of the target first pictures according to the adjusted at least one parameter of the first setting.

In an exemplary embodiment of the invention, the adjusted at least one parameter of the first setting for each of the target first pictures is different.

In an exemplary embodiment of the invention, the second setting includes the at least one parameter. The third code segment is further configured to: dynamically adjust the at least one parameter of the second setting for each of the target second pictures; and process each of the target second pictures according to the adjusted at least one parameter of the second setting.

In an exemplary embodiment of the invention, the adjusted at least one parameter of the second setting for each of the target second pictures is different.

In an exemplary embodiment of the invention, the at least one parameter includes a first parameter and a second parameter. The first parameter of the first setting for each of the target first pictures is identical with the first parameter of the second setting for the corresponding one of the target second pictures. The second parameter of the first setting for each of the target first pictures is different from the second parameter of the second setting for the corresponding one of the target second pictures.

In an exemplary embodiment of the invention, the program code further includes: a fifth code segment, configured to generate an image information according to the source image. The first code segment separates the source image into the first image and the second image according to the image information.

In an exemplary embodiment of the invention, the first image is a foreground image of the source image, and the second image is a background image of the source image.

The invention provides an apparatus including a processor and a non-transitory storage medium. The non-transitory storage medium includes a program code executable by the processor. The apparatus is configured to execute the program code with the processor for processing a source image to generate a target image, wherein the target image includes a plurality of target pictures. The program code includes: a first code segment, configured to separate the source image into a first image including a first part of the source image and a second image including a second part of the source image; a second code segment, configured to process the first image to obtain a plurality of target first pictures according to a first setting; a third code segment, configured to process the second image to obtain a plurality of target second pictures according to a second setting; and a fourth code segment, configured to combine each of the target first pictures with a corresponding one of the target second pictures to obtain the plurality of target pictures.

In an exemplary embodiment of the invention, the second setting is different from the first setting.

In an exemplary embodiment of the invention, the first setting includes at least one parameter. The processor executes the second code segment to dynamically adjust the at least one parameter of the first setting for each of the target first pictures, and process each of the target first pictures according to the adjusted at least one parameter of the first setting.

In an exemplary embodiment of the invention, the adjusted at least one parameter of the first setting for each of the target first pictures is different.

In an exemplary embodiment of the invention, the second setting includes the at least one parameter. The processor executes the third code segment to dynamically adjust the at least one parameter of the second setting for each of the target second pictures, and process each of the target second pictures according to the adjusted at least one parameter of the second setting.

In an exemplary embodiment of the invention, the adjusted at least one parameter of the second setting for each of the target second pictures is different.

In an exemplary embodiment of the invention, the at least one parameter includes a first parameter and a second parameter. The first parameter of the first setting for each of the target first pictures is identical with the first parameter of the second setting for the corresponding one of the target second pictures. The second parameter of the first setting for each of the target first pictures is different from the second parameter of the second setting for the corresponding one of the target second pictures.

In an exemplary embodiment of the invention, the program code further includes a fifth code segment. The processor executes the fifth code segment to generate an image information according to the source image, and executes the first code segment to separate the source image into the first image and the second image according the image information.

In an exemplary embodiment of the invention, the source image includes an image information. The source image is separated into the first image and the second image according to the image information.

In an exemplary embodiment of the invention, the processor receives the source image of a first type, and outputs the target pictures to a display apparatus of a second type. The target pictures are displayed in the display apparatus of the second type.

In an exemplary embodiment of the invention, the first image is a foreground image of the source image, and the second image is a background image of the source image.

The invention provides a non-transitory storage medium including a program code. The program code is executable for a processor for processing a source image to generate a target image. The target image includes a plurality of target pictures. The program code includes: a first code segment, configured to separate the source image into a first image including a first part of the source image and a second image including a second part of the source image; a second code segment, configured to process the first image to obtain a plurality of target first pictures according to a first setting, and process the second image to obtain a plurality of target second pictures according to a second setting; and a third code segment, configured to combine each of the target first pictures with a corresponding one of the target second pictures to obtain the plurality of target pictures.

In an exemplary embodiment of the invention, the second setting is different from the first setting.

The invention provides an apparatus including a processor and a non-transitory storage medium. The non-transitory storage medium includes a program code executable by the processor. The apparatus is configured to execute the program code with the processor for processing a source image to generate a target image. The target image includes a plurality of target pictures. The program code includes a first code segment, configured to separate the source image into a first image including a first part of the source image and a second image including a second part of the source image; a second code segment, configured to process the first image to obtain a plurality of target first pictures according to a first setting, and process the second image to obtain a plurality of target second pictures according to a second setting; and a third code segment, configured to combine each of the target first pictures with a corresponding one of the target second pictures to obtain the plurality of target pictures.

In an exemplary embodiment of the invention, the second setting is different from the first setting.

According to the above descriptions, in the exemplary embodiments of the invention, the first image and the second image are respectively processed to obtain the target first pictures and the target second pictures according to the first setting and the second setting. Accordingly, the satisfactory visual effects are provided.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
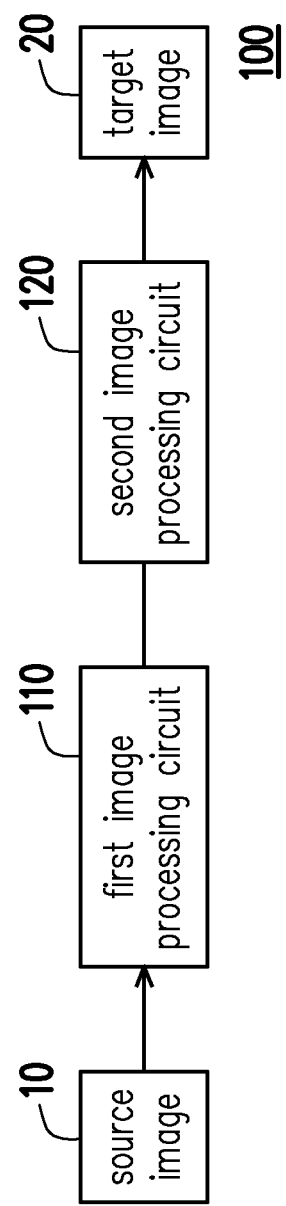
FIG. 1 illustrates a schematic diagram of an image processing apparatus according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

The term "coupling/coupled" used in this specification (including claims) of the disclosure may refer to any direct or indirect connection means. For example, "a first device is coupled to a second device" should be interpreted as "the first device is directly connected to the second device" or "the first device is indirectly connected to the second device through other devices or connection means." In addition, the term "signal" can refer to a current, a voltage, a charge, a temperature, data, electromagnetic wave or any one or multiple signals.

FIG. 1 illustrates a schematic diagram of an image processing apparatus according to an embodiment of the invention. Referring to FIG. 1, the image processing apparatus 100 of the present embodiment is configured to process a source image 10 to generate a target image 20. In the present embodiment, the image processing apparatus 100 includes a first image processing circuit 110 and a second image processing circuit 120. The second image processing circuit 120 is electrically connected to the first image processing circuit 110.

Figure 2:
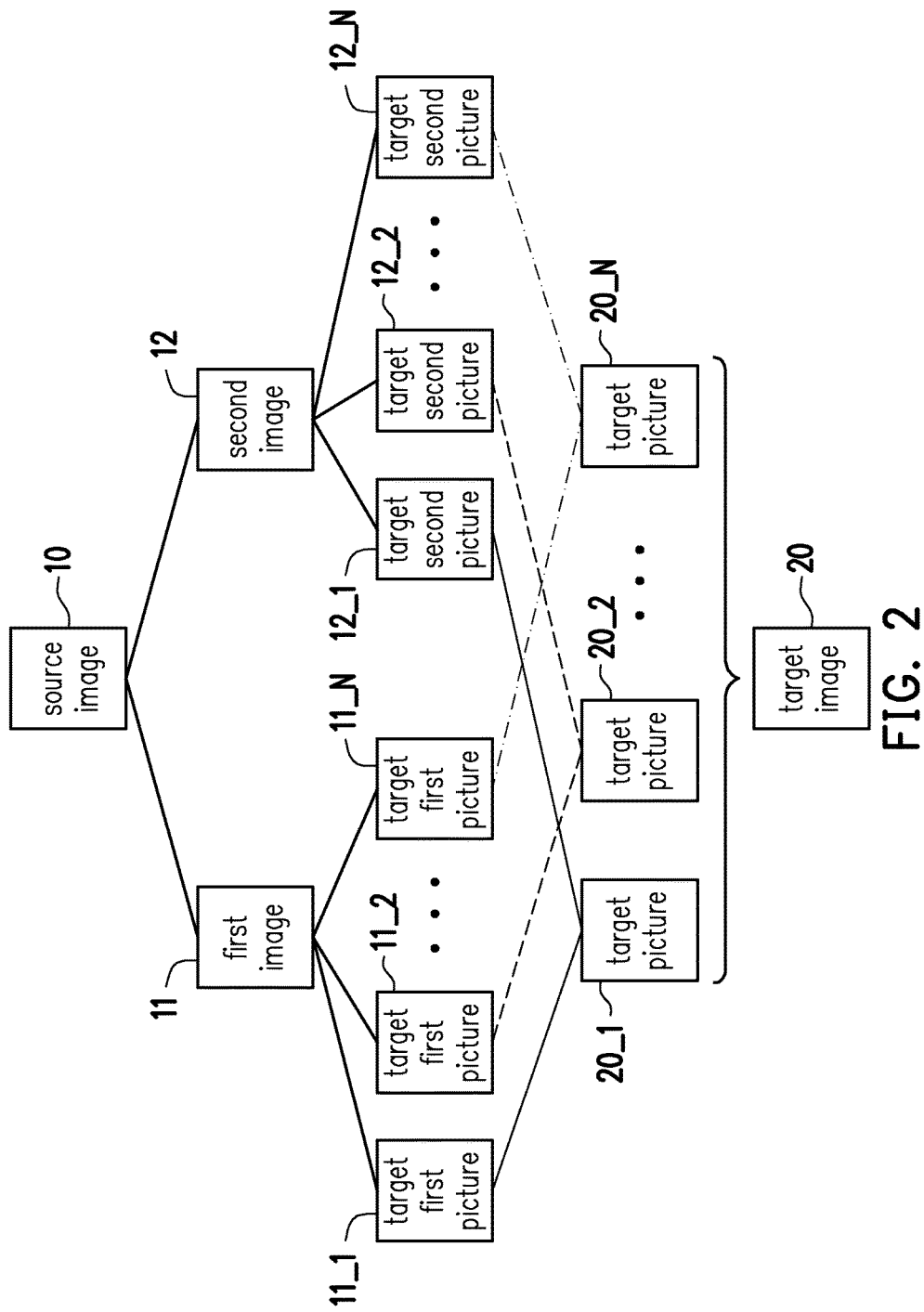
FIG. 2 illustrates a relationship between the source image and the target image according to an embodiment of the invention.

To be specific, the first image processing circuit 110 of the present embodiment separates the source image 10 into a first image 11 and a second image 12 as illustrated in FIG. 2. FIG. 2 illustrates a relationship between the source image and the target image according to an embodiment of the invention. In the present embodiment, the first image 11 may include a first part of the source image 10, and the second image 12 may include a second part of the source image 10. For example, in an embodiment, the source image 10 may be a two or three dimensional image. The first image 11 may be a foreground image including a foreground segmentation of the source image 10, and the second image 12 may be a background image including a background segmentation of the source image 10. Nevertheless, the invention is not intended to limit the types of the source image 10, the first image 11 and the second image 12.

In an embodiment, the first image processing circuit 110 includes, for example, Central Processing Unit (CPU), Microprocessor, Digital Signal Processor (DSP), Programmable Controller, Programmable Logic Device (PLD), Graphics Processing Unit (GPU), or other similar devices, or a combination of the said devices, which are not particularly limited by the invention. Further, in an embodiment, the first image processing circuit 110 depicted in FIG. 1 may be implemented as a module including a plurality of program codes. These program codes will be stored in one memory, so that these program codes may be executed by a processor or other similar devices. Alternatively, in an embodiment, the first image processing circuit 110 depicted in FIG. 1 may be implemented as one or more circuits. The invention is not intended to limit whether the first image processing circuit 110 is implemented by ways of software or hardware.

In the present embodiment, the second image processing circuit 120 processes the first image 11 to obtain a plurality of target first pictures 11_1 to 11_N according to a first setting as illustrated in FIG. 2, where N is a positive integer larger than 1. The second image processing circuit 120 processes the second image 12 to obtain a plurality of target second pictures 12_1 to 12_N according to a second setting. The second image processing circuit 120 combines each of the target first pictures 11_1 to 11_N with a corresponding one of the target second pictures 12_1 to 12_N to obtain the plurality of target pictures 20_1 to 20_N. For example, the second image processing circuit 120 combines the target first picture 11_1 with the target second picture 12_1 to obtain the target picture 20_1, and the second image processing circuit 120 combines the target first picture 11_2 with the target second picture 12_2 to obtain the target picture 20_2. Other target pictures may be obtained by analogy, and it will not further described again herein. In the present embodiment, the target image 20 includes a plurality of target pictures 20_1 to 20_N.

In the present embodiment, the first setting and the second setting may respectively include one or more parameters for image processing. The one or more parameters for image processing may be applied to images or pictures to adjust image content characteristics, such as image resolution, the image brightness, image spectral distribution, image discrepancy, image relevancy, image color depth, image refresh rate, display mode or other similar characteristics. In another embodiment, the one or more parameters may be applied to adjust start phase and/or scale ratio of the first image 11 and the second image 12. In the present embodiment, parameter values and/or parameter types of the second setting may be different from that of the first setting, and the invention is not limited thereto.

In the present embodiment, the first image 11 and the second image 12 may be processed by the second image processing circuit 120 in series, or in parallel, or in a manner of pipeline respectively. Nevertheless, the invention is not intended to limit the process sequence of the first image 11 and the second image 12.

In an embodiment, the second image processing circuit 120 includes, for example, Central Processing Unit (CPU), Microprocessor, Digital Signal Processor (DSP), Programmable Controller, Programmable Logic Device (PLD), Graphics Processing Unit (GPU), or other similar devices, or a combination of the said devices, which are not particularly limited by the invention. Further, in an embodiment, the second image processing circuit 120 depicted in FIG. 1 may be implemented as a module including a plurality of program codes. These program codes will be stored in one memory, so that these program codes may be executed by a processor or other similar devices. Alternatively, in an embodiment, the second image processing circuit 120 depicted in FIG. 1 may be implemented as one or more circuits. The invention is not intended to limit whether the second image processing circuit 120 is implemented by ways of software or hardware.

Figure 3:
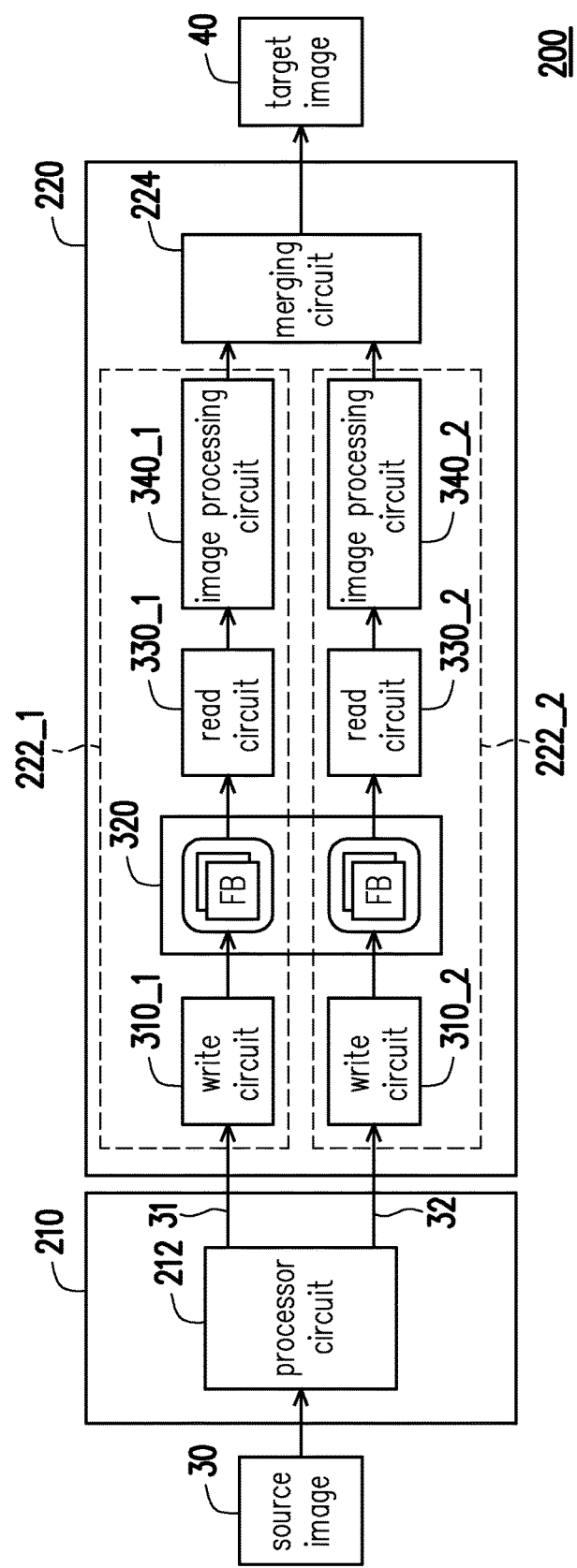
FIG. 3 illustrates a schematic diagram of an image processing apparatus according to another embodiment of the invention.

FIG. 3 illustrates a schematic diagram of an image processing apparatus according to another embodiment of the invention. Referring to FIG. 3, the first image processing circuit 210 of the present embodiment includes a processor circuit 212. The processor circuit 212 separates the source image 30 into the first image 31 and the second image 32, and then outputs the first image 31 and the second image 32 to the second image processing circuit 220. The second image processing circuit 220 may store the first image 31 and the second image 32 into buffer circuits or memory circuits. In the present embodiment, the first image 31 and the second image 32 may be respectively a foreground image and a background image of the source image 30, but the invention is not limited thereto.

In the present embodiment, the processor circuit 212 may execute an image segmentation operation on the source image 30 to separate the source image 30 into the first image 31 and the second image 32 by software. For example, for the source image 30 of two dimensions, the processor circuit 212 detects an object mask of the foreground image by using a salient object detection algorithm. The processor circuit 212 separates the source image 30 into the foreground image and the background image according to the object mask and a grabcut algorithm, i.e. an image segmentation method based on graph cuts, or the like. For the background image, the processor circuit 212 fills up empty area(s) due to segmentation by using an inpainting algorithm, i.e. a process of reconstructing lost or deteriorated parts of images and videos. Accordingly, the foreground image and the background image of the source image 30 may be obtained.

In the present embodiment, the image segmentation operation may be implemented as a module including a plurality of program codes. These program codes will be stored in one memory, so that these program codes may be executed by the processor circuit 212. In the present embodiment, the segmentation algorithm/method may be implemented by using steps in any segmentation algorithms/methods in the related art, which are not particularly limited by the invention. Enough teaching, suggestion, and implementation illustration for aforesaid steps and embodiments thereof may be obtained with reference to common knowledge in the related art, which is not repeated hereinafter. In the present embodiment, the processor circuit 212 includes, for example, Central Processing Unit (CPU), Microprocessor, Digital Signal Processor (DSP), Programmable Controller, Programmable Logic Device (PLD), Graphics Processing Unit (GPU), or other similar devices, or a combination of the said devices, which are not particularly limited by the invention.

In another embodiment, the image segmentation operation executed on the source image 30 may be implemented by hardware. In this case, the first image processing circuit 210 depicted in FIG. 3 may be implemented as one or more adaptive circuits in the related art. Enough teaching, suggestion, and implementation illustration for the first image processing circuit 210 and embodiments thereof may be obtained with reference to common knowledge in the related art, which is not repeated hereinafter.

Figure 4:
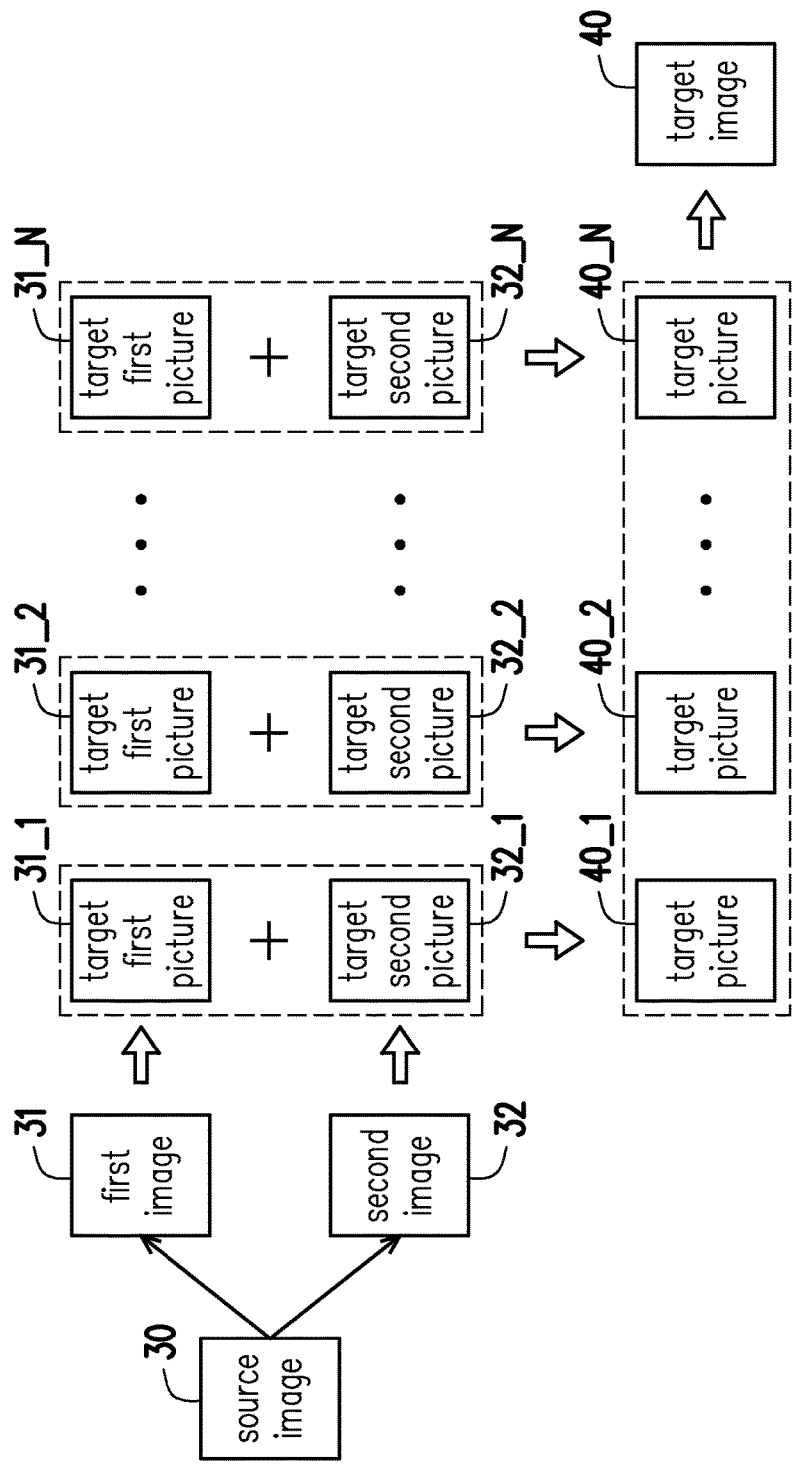
FIG. 4 illustrates a relationship between the source image and the target image according to another embodiment of the invention.

In the present embodiment, the second image processing circuit 220 of the present embodiment includes a first image processing channel 222_1 and a second image processing channel 222_2, and a merging circuit 224. The first image processing channel 222_1 and the second image processing channel 222_2 are electrically connected to the first image processing circuit 210, respectively. The first image processing channel 222_1 receives the first image 31 and processes the first image 31 to obtain the plurality of target first pictures 31_1 to 31_N according to the first setting as illustrated in FIG. 4. FIG. 4 illustrates a relationship between the source image and the target image according to another embodiment of the invention. On the other hand, the second image processing channel 222_2 receives the second image 32 and processes the second image 32 to obtain the plurality of target second pictures 32_1 to 32_N according to the second setting. In the present embodiment, the first image processing channel 222_1 and the second image processing channel 222_2 respectively operate in a manner of pipeline, and the second setting is different from the first setting.

Next, the merging circuit 224 combines each of the target first pictures 31_1 to 31_N with a corresponding one of the target second pictures 32_1 to 32_N to obtain a plurality of target pictures 40_1 to 40_N as illustrated in FIG. 4. The target image 40 includes the target pictures 40_1 to 40_N and is outputted to a display apparatus to be displayed. In the present embodiment, the merging circuit 224 depicted in FIG. 3 may be implemented as any adaptive circuit, e.g. an on-screen-display (OSD) mixer or other similar circuits, in the related art. Enough teaching, suggestion, and implementation illustration for the merging circuit 224 and embodiments thereof may be obtained with reference to common knowledge in the related art, which is not repeated hereinafter.

In an embodiment, the display apparatus includes flat panel displays, curved panel displays or 3D displays, including Liquid Crystal Display (LCD), Plasma Display Panel (PDP), Organic Light Emitting Display (OLED), Field Emission Display (FED), Electro-Phoretic Display (EPD) or Light Emitting Diode Display and the like, which are not limited by the invention.

In the present embodiment, the second image processing circuit 220 may output the target image 40 to a display apparatus of two dimensions (not shown) to be displayed. The display apparatus of the two dimensions displays two dimensional images. For example, the first image processing circuit 210 may process the source image 30 of the two dimensions, and the second image processing circuit 220 may be a part of television system on chip (SoC) pipeline. After image processing by using different first and second settings, the second image processing circuit 220 outputs the target image 40 to the display apparatus to be displayed. The display apparatus of the two dimensions may display the target image 40 of the two dimensions and present special effect of three dimensions in the present embodiment. Nevertheless, the invention is not intended to limit the formats of the source image 30, the target image 40, and the type of the display apparatus.

Description regarding how the first image processing channel 222_1 and the second image processing channel 222_2 respectively operate in the manner of pipeline according to the different first and second settings is provided as follows.

Referring to FIG. 3 and FIG. 4, the first image processing channel 222_1 of the present embodiment includes a write circuit 310_1, a memory circuit 320, a read circuit 330_1 and an image processing circuit 340_1 coupled in series. To be specific, the write circuit 310 1 receives the first image 31 from the first image processing circuit 210, and writes the first image 31 into fame buffers FB of the memory circuit 320 for data storage. Next, the read circuit 330_1 reads the first image 31 from the memory circuit 320, and transmits the read first image 31 to the image processing circuit 340_1 of a next stage.

In the present embodiment, the memory circuit 320 may include, for example, the SDRAM (synchronous dynamic random-access memory), DDR (Double Data Rate), DDR2, DDR3, or other similar memories. In another embodiment, the memory circuit 320 may include a SRAM (static random access memory), a DRAM (dynamic random access memory), or a ROM (read-only memory). Nevertheless, the invention is not intended to limit the type of the memory circuit 320. In the present embodiment, the write circuit 310_1 and the read circuit 330_1 may be deemed as a part of a memory control circuit for controlling the access of data stored in the memory circuit 320. In an embodiment, the memory control circuit may further include a memory management circuit, a host interface, a memory interface, a buffer memory, a power management circuit, and an error checking and correcting circuit, or other adaptive circuits. The write circuit 310_1 and the read circuit 330_1 depicted in FIG. 3 may be implemented as any adaptive circuits in the related art. Enough teaching, suggestion, and implementation illustration for the write circuit 310_1 and the read circuit 330_1 and embodiments thereof may be obtained with reference to common knowledge in the related art, which is not repeated hereinafter.

In the present embodiment, the image processing circuit 340_1 processes the first image 31 to obtain the target first pictures 31_1 to 31_N according to the first setting as illustrated in FIG. 4. The first setting may include at least one of a pan parameter, a crop parameter, a scale ratio parameter, and a start phase parameter in the present embodiment. When the image processing circuit 340_1 processes the first image 31 to obtain the target first pictures 31_1 to 31_N according to the first setting, the image processing circuit 340_1 dynamically adjusts the at least one parameter of the first setting for each of the target first pictures 31_1 to 31_N. And the image processing circuit 340_1 processes each of the target first pictures 31_1 to 31_N according to the adjusted at least one parameter of the first setting.

For example, for the target first picture 31_1, the image processing circuit 340_1 sets the scale ratio parameter to be 1 and the start phase parameter to be 0 in the initial time frame. The image processing circuit 340_1 executes image processing operations on the target first picture 31_1 according to the set scale ratio parameter and the set start phase parameter. For the target first picture 31_2, the image processing circuit 340_1 adjusts the scale ratio parameter to be 1.0001 and the start phase parameter to be 1 in the next time frame. The image processing circuit 340_1 executes the image processing operations on the target first picture 31_2 according to the adjusted scale ratio parameter and the adjusted start phase parameter. For other target first pictures, the image processing operations and the parameter adjustment may be deduced by analogy, and therefore descriptions are omitted here. Accordingly, the image processing circuit 340_1 dynamically adjusts the scale ratio parameter and the start phase parameter of the first setting for each of the target first pictures 31_1 to 31_N. The adjusted scale ratio parameter for each of the target first pictures 31_1 to 31_N is different, and the adjusted scale ratio parameter for each of the target first pictures 31_1 to 31_N is also different. In other words, the adjusted at least one parameter of the first setting for each of the target first pictures 31_1 to 31_N is different in the present embodiment. Nevertheless, the invention is not intended to limit the variation trend and the parameter values of the adjusted scale ratio parameter and the adjusted scale ratio parameter. Accordingly, the target first pictures 31_1 to 31_N are obtained according to the first setting, and outputted to the merging circuit 224 for image merging.

In the present embodiment, the first image processing channel 222_1 is similar to the second image processing channel 222_2. When the image processing circuit 340_2 processes the second image 32 to obtain the target second pictures 32_1 to 32_N according to the second setting, the image processing circuit 340_2 dynamically adjusts at least one parameter of the second setting for each of the target second pictures 32_1 to 32_N. The image processing circuit 340_2 processes each of the target second pictures 32_1 to 32_N according to the adjusted at least one parameter of the second setting.

For example, for the target second picture 32_1, the image processing circuit 340_2 sets the scale ratio parameter to be 1 and the start phase parameter to be 0 in the initial time frame. The image processing circuit 340_2 executes image processing operations on the target second picture 32_1 according to the set scale ratio parameter and the set start phase parameter. For the target second picture 32_2, the image processing circuit 340_2 adjusts the scale ratio parameter to be 0.9999 and the start phase parameter to be 1 in the next time frame. The image processing circuit 340_2 executes the image processing operations on the target second picture 32_2 according to the adjusted scale ratio parameter and the adjusted start phase parameter. For other target second pictures, the image processing operations and the parameter adjustment may be deduced by analogy, and therefore descriptions are omitted here. Accordingly, the image processing circuit 340_2 dynamically adjusts the scale ratio parameter and the start phase parameter of the second setting for each of the target second pictures 32_1 to 32_N. The adjusted scale ratio parameter for each of the target second pictures 32_1 to 32_N is different, and the adjusted scale ratio parameter for each of the target second pictures 32_1 to 32_N is also different. In other words, the adjusted at least one parameter of the second setting for each of the target second pictures 32_1 to 32_N is different in the present embodiment. Nevertheless, the invention is not intended to limit the variation trend and the parameter values of the adjusted scale ratio parameter and the adjusted scale ratio parameter. Accordingly, the target second pictures 32_1 to 32_N are obtained according to the second setting, and outputted to the merging circuit 224 for image merging.

In the present embodiment, the start phase parameter of the first setting for each of the target first pictures 31_1 to 31_N is identical with the start phase parameter of the second setting for the corresponding one of the target second pictures 32_1 to 32_N. For example, the start phase parameter of the first setting for the target first picture 31_1, e.g. 0, is identical with the start phase parameter of the second setting for the target second picture 32_1. The start phase parameter of the first setting for the target first picture 31_2, e.g. 1, is also identical with the start phase parameter of the second setting for the target second picture 32_2. The relationship between the start phase parameter of the first setting for other target first pictures and the start phase parameter of the second setting for other target second pictures may be deduced by analogy, and therefore descriptions is omitted here.

In addition, the scale ratio parameter of the first setting for each of the target first pictures 31_2 to 31_N is different from the scale ratio parameter of the second setting for the corresponding one of the target second pictures 32_2 to 32_N. For example, the scale ratio parameter of the first setting for the target first picture 31_2, e.g. 1.0001, is different from the scale ratio parameter of the second setting for the target second picture 32_2, e.g. 0.9999. The relationship between the scale ratio parameter of the first setting for other target first pictures and the scale ratio parameter of the second setting for other target second pictures may be deduced by analogy, and therefore descriptions is omitted here.

In the present embodiment, the image processing circuits 340_1 and 340_2 respectively include, for example, Central Processing Unit (CPU), Microprocessor, Digital Signal Processor (DSP), Programmable Controller, Programmable Logic Device (PLD), Graphics Processing Unit (GPU), or other similar devices, or a combination of the said devices, which are not particularly limited by the invention. Further, in an embodiment, the image processing circuits 340_1 and 340_2 depicted in FIG. 3 may be respectively implemented as modules including a plurality of program codes. These program codes will be stored in one memory, so that these program codes may be executed by a processor or other similar devices. Alternatively, in an embodiment, the image processing circuits 340_1 and 340_2 depicted in FIG. 3 may be implemented as one or more circuits, scaler circuits. The invention is not intended to limit whether the image processing circuits 340_1 and 340_2 are implemented by ways of software or hardware.

Figure 5:
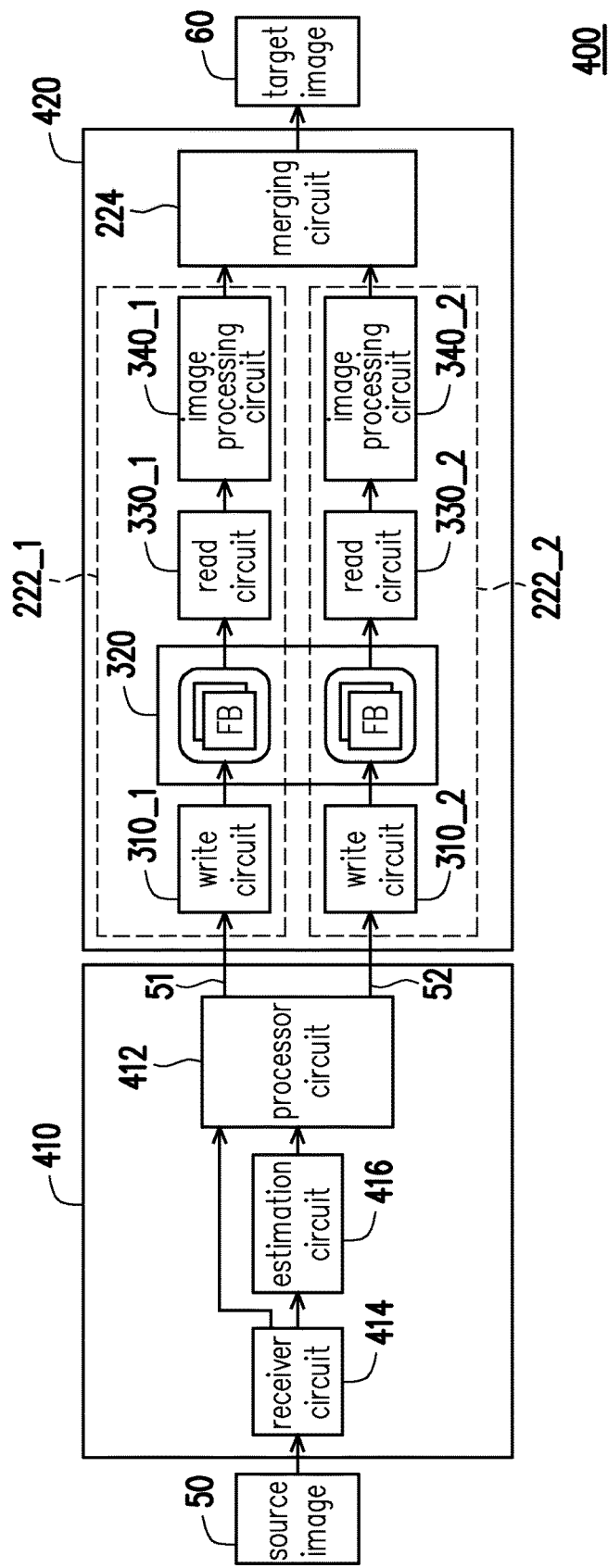
FIG. 5 illustrates a schematic diagram of an image processing apparatus according to another embodiment of the invention.

FIG. 5 illustrates a schematic diagram of an image processing apparatus according to another embodiment of the invention. Referring to FIG. 3 and FIG. 5, the image processing apparatus 400 of the present embodiment is similar to that of the image processing apparatus 200 depicted in FIG. 3. The main difference therebetween, for example, lies in that the first image processing circuit 410 generates an image information according to the source image 50, and separates the source image 50 into the first image 51 and the second image 52 according the image information.

To be specific, the first image processing circuit 410 includes a receiver circuit 414, an estimation circuit 416, and a processor circuit 412. In the present embodiment, the first image processing circuit 410 may process the source image 50 of three dimensions. The source image 50 of the three dimensions includes a left-eye image and a right-eye image. The receiver circuit 414 receives the source image 50 including the left-eye image and the right-eye image, and transmits the left-eye image and the right-eye image to the estimation circuit 416 for information estimation and to the processor circuit 412 for image segmentation. In the present embodiment, the estimation circuit 416 executes an information estimation operation on the left-eye image and the right-eye image to generate image information, e.g. depth information of the three dimensional image. The processor circuit 412 separates the source image 50 into the first image 51 and the second image 52 according the depth information. In the present embodiment, the processor circuit 412 may separate each of the left-eye image and the right-eye image into the first image 51 and the second image 52 according the depth information. For example, the processor circuit 412 may first separate the left-eye image into a pair of the first image 51 and the second image 52 according the depth information, and then separate the right-eye image into another pair of the first image 51 and the second image 52 according the depth information, and vice versa.

In the present embodiment, the image segmentation operation by the depth information may be implemented as a module including a plurality of program codes. These program codes will be stored in one memory, so that these program codes may be executed by the processor circuit 412. In the present embodiment, the segmentation algorithm/method by the depth information may be implemented by using steps in any segmentation algorithms/methods by the depth information in the related art, which are not particularly limited by the invention. Enough teaching, suggestion, and implementation illustration for aforesaid steps and embodiments thereof may be obtained with reference to common knowledge in the related art, which is not repeated hereinafter.

In another embodiment, the image segmentation operation by the depth information executed on the source image 50 including the left-eye image and the right-eye image may be implemented by hardware. In this case, the processor circuit 412 depicted in FIG. 4 may be implemented as one or more adaptive circuits in the related art. Enough teaching, suggestion, and implementation illustration for the processor circuit 412 and embodiments thereof may be obtained with reference to common knowledge in the related art, which is not repeated hereinafter.

In an embodiment, the estimation circuit 416 depicted in FIG. 5 may be implemented as a module including a plurality of program codes. These program codes will be stored in one memory, so that these program codes may be executed by a processor, e.g. the processor circuit 412, or other similar devices. Alternatively, in an embodiment, the estimation circuit 416 depicted in FIG. 5 may be implemented as one or more adaptive circuits in the related. Enough teaching, suggestion, and implementation illustration for the estimation circuit 416 and embodiments thereof may be obtained with reference to common knowledge in the related art, which is not repeated hereinafter. The invention is not intended to limit whether the estimation circuit 416 is implemented by ways of software or hardware.

In the present embodiment, the second image processing circuit 420 receives the first image 51 and the second image 52. The second image processing circuit 420 processes the first image 51 to obtain a plurality of target first pictures according to a first setting, and processes the second image 52 to obtain a plurality of target second pictures according to a second setting. The second image processing circuit 420 combines each of the target first pictures with a corresponding one of the target second pictures to obtain the plurality of target pictures, and outputs the target image 60. The target image 60 includes the plurality of target pictures.

Besides, the operation of the second image processing circuit 420 described in this embodiment of the invention is sufficiently taught, suggested, and embodied in the embodiments illustrated in FIG. 1 to FIG. 4, and therefore no further description is provided herein.

In the present embodiment, the second image processing circuit 420 outputs the target image 60 to a display apparatus of two dimensions (not shown) to be displayed. The first image processing circuit 410 processes the source image 50 of the three dimensions, and the second image processing circuit 420 may be a part of television system on chip (SoC) pipeline. After image processing by using different first and second settings, the second image processing circuit 420 outputs the target image 60 to the display apparatus to be displayed. The display apparatus of the two dimensions displays the target image 60 of the three dimensions and presents special effect of the three dimensions in the present embodiment. In other words, the first image processing circuit 410 receives the source image 50 of a first type. The second image processing circuit 420 outputs the obtained target pictures to the display apparatus of a second type, and the obtained target pictures are displayed in the display apparatus of the second type.

Figure 6:
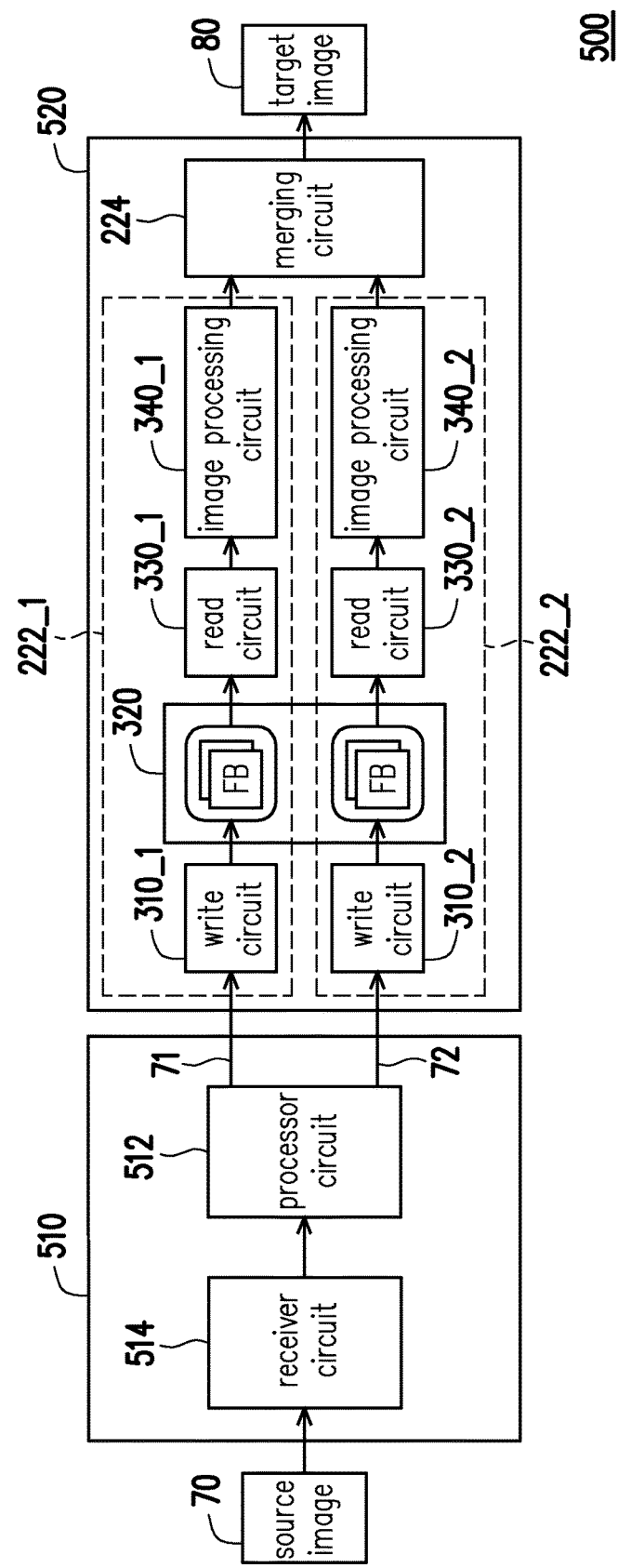
FIG. 6 illustrates a schematic diagram of an image processing apparatus according to another embodiment of the invention.

FIG. 6 illustrates a schematic diagram of an image processing apparatus according to another embodiment of the invention. Referring to FIG. 5 and FIG. 6, the image processing apparatus 500 of the present embodiment is similar to that of the image processing apparatus 400 depicted in FIG. 5. The main difference therebetween, for example, lies in that the source image 70 including an image information, such as the depth information, and the first image processing circuit 510 separates the source image 70 into the first image 71 and the second image 72 according the image information.

To be specific, the first image processing circuit 510 includes a receiver circuit 514 and a processor circuit 512. In the present embodiment, the first image processing circuit 510 may process the source image 70 of three dimensions. The source image 70 of the three dimensions includes a three dimensional image and a depth information thereof. The receiver circuit 514 receives the source image 70 and transmits the source image 70 to the processor circuit 512 for image segmentation. In the present embodiment, the processor circuit 512 separates the source image 50 into the first image 51 and the second image 52 according the depth information.

Besides, the operation of the image processing apparatus 500 described in this embodiment of the invention is sufficiently taught, suggested, and embodied in the embodiments illustrated in FIG. 1 to FIG. 5, and therefore no further description is provided herein.

In an embodiment, the receiver circuits 414 and 514 may be implemented as one or more adaptive circuits in the related. Enough teaching, suggestion, and implementation illustration for the receiver circuits 414 and 514 and embodiments thereof may be obtained with reference to common knowledge in the related art, which is not repeated hereinafter.

Figure 7:
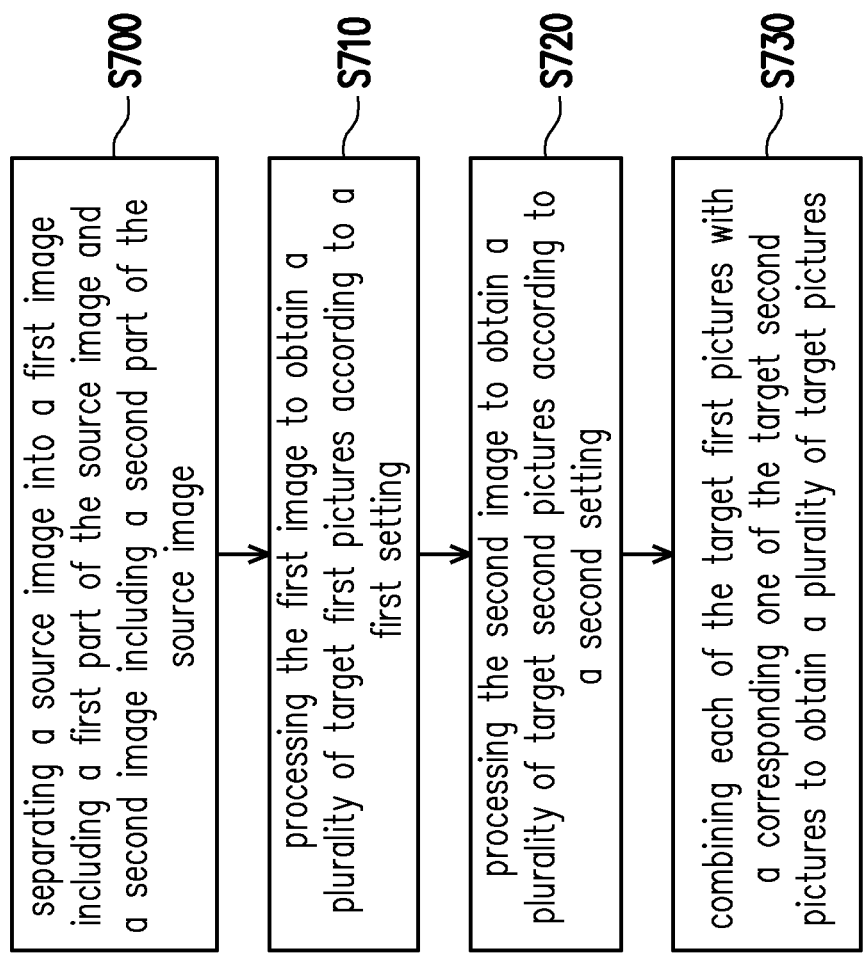
FIG. 7 is a flowchart illustrating steps in a method for processing a source image to generate a target image according to an embodiment of the invention.

FIG. 7 is a flowchart illustrating steps in a method for processing a source image to generate a target image according to an embodiment of the invention. Referring to FIG. 1, FIG. 2 and FIG. 7, the method for processing the source image to generate the target image of the present embodiment is at least adapted to the image processing apparatus 100 depicted in FIG. 1, but the invention is not limited thereto. Taking the image processing apparatus 100 of FIG. 1 for example, in step S700, the image processing apparatus 100 separates the source image 10 into a first image 11 including a first part of the source image 10 and a second image 12 including a second part of the source image 10. In an embodiment, the source image 10 is a two dimensional image or a three dimensional image. In an embodiment, the first image 11 is a foreground image of the source image 10, and the second image 12 is a background image of the source image 10.

In step S710, the image processing apparatus 100 processes the first image 11 to obtain a plurality of target first pictures 11_1 to 11_N according to a first setting. In step S720, the image processing apparatus 100 processes the second image 12 to obtain a plurality of target second pictures 12_1 to 12_N according to a second setting, where the second setting is different from the first setting in an embodiment. It should be noted that the steps S710 and S720 are not ordered when the method for processing the source image to generate the target image is performed, the steps may be executed at the same time in a manner of pipeline or at different time.

In step S730, the image processing apparatus 100 combines each of the target first pictures 11_1 to 11_N with a corresponding one of the target second pictures 12_1 to 12_N to obtain the plurality of target pictures 20_1 to 20_N. In the present embodiment, the target image 20 includes a plurality of target pictures 20_1 to 20_N. In the present embodiment, the target image 20 is outputted to a display apparatus of two dimensions to be displayed, but the invention is not limited thereto.

Besides, the method for processing the source image to generate the target image described in this embodiment of the invention is sufficiently taught, suggested, and embodied in the embodiments illustrated in FIG. 1 to FIG. 6, and therefore no further description is provided herein.

In summary, in the exemplary embodiments of the invention, the first image and the second image are respectively processed to obtain the target first pictures and the target second pictures according to the first setting and the second setting, where the first setting and the second setting are different, and parameters of the first setting and the second setting are dynamically adjusted for each of the target first pictures and each of the target second pictures, respectively. Accordingly, the satisfactory visual effects are provided.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A non-transitory storage medium, comprising a program code executable for a processor for processing a source image to generate a target image, wherein the target image comprises a plurality of target pictures, and the program code comprising:
   a first code segment, configured to separate the source image into a first image comprising a first part of the source image and a second image comprising a second part of the source image;
   a second code segment, configured to process the first image to obtain a plurality of target first pictures according to a first setting;
   a third code segment, configured to process the second image to obtain a plurality of target second pictures according to a second setting; and
   a fourth code segment, configured to combine each of the target first pictures with a corresponding one of the target second pictures to obtain the plurality of target pictures.

2. The non-transitory storage medium according to claim 1, wherein the second setting is different from the first setting.

3. The non-transitory storage medium according to claim 1, wherein the first setting comprises at least one parameter, and the second code segment is further configured to:
   dynamically adjust the at least one parameter of the first setting for each of the target first pictures; and
   process each of the target first pictures according to the adjusted at least one parameter of the first setting.

4. The non-transitory storage medium according to claim 3, wherein the adjusted at least one parameter of the first setting for each of the target first pictures is different.

5. The non-transitory storage medium according to claim 3, wherein the second setting comprises the at least one parameter, and the third code segment is further configured to:
   dynamically adjust the at least one parameter of the second setting for each of the target second pictures; and
   process each of the target second pictures according to the adjusted at least one parameter of the second setting.

6. The non-transitory storage medium according to claim 5, wherein the adjusted at least one parameter of the second setting for each of the target second pictures is different.

7. The non-transitory storage medium according to claim 5, wherein the at least one parameter comprises a first parameter and a second parameter, the first parameter of the first setting for each of the target first pictures is identical with the first parameter of the second setting for the corresponding one of the target second pictures, and the second parameter of the first setting for each of the target first pictures is different from the second parameter of the second setting for the corresponding one of the target second pictures.

8. The non-transitory storage medium according to claim 1, wherein the program code further comprises:
   a fifth code segment, configured to generate an image information according to the source image, the first code segment separating the source image into the first image and the second image according to the image information.

9. The non-transitory storage medium according to claim 1, wherein the first image is a foreground image of the source image, and the second image is a background image of the source image.

10. An apparatus, comprising:
a processor; and
a non-transitory storage medium, comprising a program code executable by the processor,
the apparatus is configured to execute the program code with the processor for processing a source image to generate a target image, wherein the target image comprises a plurality of target pictures, and the program code comprising:
a first code segment, configured to separate the source image into a first image comprising a first part of the source image and a second image comprising a second part of the source image;
a second code segment, configured to process the first image to obtain a plurality of target first pictures according to a first setting;
a third code segment, configured to process the second image to obtain a plurality of target second pictures according to a second setting; and
a fourth code segment, configured to combine each of the target first pictures with a corresponding one of the target second pictures to obtain the plurality of target pictures.

11. The apparatus according to claim 10, wherein the second setting is different from the first setting.

12. The apparatus according to claim 10, wherein the first setting comprises at least one parameter, and the processor executes the second code segment to dynamically adjust the at least one parameter of the first setting for each of the target first pictures, and process each of the target first pictures according to the adjusted at least one parameter of the first setting.

13. The apparatus according to claim 12, wherein the adjusted at least one parameter of the first setting for each of the target first pictures is different.

14. The apparatus according to claim 12, wherein the second setting comprises the at least one parameter, and the processor executes the third code segment to dynamically adjust the at least one parameter of the second setting for each of the target second pictures, and process each of the target second pictures according to the adjusted at least one parameter of the second setting.

15. The apparatus according to claim 14, wherein the adjusted at least one parameter of the second setting for each of the target second pictures is different.

16. The apparatus according to claim 14, wherein the at least one parameter comprises a first parameter and a second parameter, the first parameter of the first setting for each of the target first pictures is identical with the first parameter of the second setting for the corresponding one of the target second pictures, and the second parameter of the first setting for each of the target first pictures is different from the second parameter of the second setting for the corresponding one of the target second pictures.

17. The apparatus according to claim 10, wherein the program code further comprises a fifth code segment, the processor executes the fifth code segment to generate an image information according to the source image, and executes the first code segment to separate the source image into the first image and the second image according to the image information.

18. The apparatus according to claim 10, wherein the source image comprises an image information, and the source image is separated into the first image and the second image according to the image information.

19. The apparatus according to claim 10, wherein the processor receives the source image of a first type, and outputs the target pictures to a display apparatus of a second type, and the target pictures are displayed in the display apparatus of the second type.

20. The apparatus according to claim 10, wherein the first image is a foreground image of the source image, and the second image is a background image of the source image.

21. A non-transitory storage medium, comprising a program code executable for a processor for processing a source image to generate a target image, wherein the target image comprises a plurality of target pictures, and the program code comprising:
a first code segment, configured to separate the source image into a first image comprising a first part of the source image and a second image comprising a second part of the source image;
a second code segment, configured to process the first image to obtain a plurality of target first pictures according to a first setting, and process the second image to obtain a plurality of target second pictures according to a second setting; and
a third code segment, configured to combine each of the target first pictures with a corresponding one of the target second pictures to obtain the plurality of target pictures.

22. The non-transitory storage medium according to claim 21, wherein the second setting is different from the first setting.

23. An apparatus, comprising:
a processor; and
a non-transitory storage medium, comprising a program code executable by the processor,
the apparatus is configured to execute the program code with the processor for processing a source image to generate a target image, wherein the target image comprises a plurality of target pictures, and the program code comprising:
a first code segment, configured to separate the source image into a first image comprising a first part of the source image and a second image comprising a second part of the source image;
a second code segment, configured to process the first image to obtain a plurality of target first pictures according to a first setting, and process the second image to obtain a plurality of target second pictures according to a second setting; and
a third code segment, configured to combine each of the target first pictures with a corresponding one of the target second pictures to obtain the plurality of target pictures.

24. The apparatus according to claim 23, wherein the second setting is different from the first setting.

* * * * *